(12) United States Patent
Lee et al.

(10) Patent No.: US 9,252,424 B2
(45) Date of Patent: Feb. 2, 2016

(54) COMPOSITE ANODE ACTIVE MATERIAL, METHOD OF PREPARING COMPOSITE ANODE ACTIVE MATERIAL, AND ANODE AND LITHIUM BATTERY INCLUDING COMPOSITE ANODE ACTIVE MATERIAL

(75) Inventors: Jong-Hee Lee, Yongin-si (KR); Yong-Mi Yu, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 519 days.

(21) Appl. No.: 13/572,523

(22) Filed: Aug. 10, 2012

(65) Prior Publication Data

US 2013/0189583 A1     Jul. 25, 2013

(30) Foreign Application Priority Data

Jan. 19, 2012 (KR) .................. 10-2012-0006404

(51) Int. Cl.
| | |
|---|---|
| *H01M 4/38* | (2006.01) |
| *H01M 4/485* | (2010.01) |
| *H01M 4/36* | (2006.01) |
| *H01M 4/48* | (2010.01) |
| *H01M 4/587* | (2010.01) |

(52) U.S. Cl.
CPC .............. *H01M 4/364* (2013.01); *H01M 4/38* (2013.01); *H01M 4/382* (2013.01); *H01M 4/386* (2013.01); *H01M 4/387* (2013.01); *H01M 4/483* (2013.01); *H01M 4/485* (2013.01); *H01M 4/587* (2013.01); *Y02E 60/122* (2013.01)

(58) Field of Classification Search
CPC ..... H01M 4/131; H01M 4/134; H01M 4/362; H01M 4/48; H01M 4/84
USPC .................................................. 429/121–347
See application file for complete search history.

(56) References Cited

U.S. PATENT DOCUMENTS

| | | | |
|---|---|---|---|
| 2008/0248389 | A1 | 10/2008 | Jeong et al. |
| 2009/0114124 | A1 | 5/2009 | Baldi et al. |
| 2010/0092868 | A1 | 4/2010 | Kim et al. |
| 2010/0173198 | A1 | 7/2010 | Zhamu et al. |

FOREIGN PATENT DOCUMENTS

| | | |
|---|---|---|
| JP | 2009-032644 A | 2/2009 |
| KR | 10-2008-0019801 A | 3/2008 |
| KR | 10-2008-0090654 A | 10/2008 |
| KR | 10-2008-0100811 A | 11/2008 |
| KR | 10-2010-0041567 A | 4/2010 |

OTHER PUBLICATIONS

Zeng, Z.y., J.p. Tu, X.I. Wang, and X.b. Zhao. "Electrochemical Properties of Si/LiTi2O4 Nanocomposite as Anode Materials for Li-ion Secondary Batteries." Journal of Electroanalytical Chemistry 616.1-2 (2008): 7-13.*

* cited by examiner

*Primary Examiner* — Kenneth Douyette
*Assistant Examiner* — James Lee
(74) *Attorney, Agent, or Firm* — Robert E. Bushnell, Esq.

(57) ABSTRACT

A composite anode active material includes matrix particles including lithium titanate; and at least one nanoparticle dispersed in the matrix particles. The at least one nanoparticle includes at least one selected from the group a metal capable of forming alloys with lithium and a non-transition metal oxide.

19 Claims, 3 Drawing Sheets

COMPOSITE ANODE ACTIVE MATERIAL, METHOD OF PREPARING COMPOSITE ANODE ACTIVE MATERIAL, AND ANODE AND LITHIUM BATTERY INCLUDING COMPOSITE ANODE ACTIVE MATERIAL

CLAIM OF PRIORITY

This application makes reference to, incorporates the same herein, and claims all benefits accruing under 35 U.S.C. §119 from an application earlier filed in the Korean Intellectual Property Office on 19 Jan. 2012 and there duly assigned Serial No. 10-2012-0006404.

BACKGROUND OF THE INVENTION

1. Field of the Invention

One or more embodiments of the present invention relate to a composite anode active material, a method of preparing the composite anode active material, and an anode and lithium battery including the composite anode active material.

2. Description of the Related Art

Carbonaceous materials such as graphite are representative examples of anode active materials for lithium batteries. Graphite has excellent capacity retention characteristics and excellent voltage characteristics. In addition, graphite does not vary in volume when it is used to form an alloy with lithium. Therefore, anode including graphite may increase the stability of a battery. Graphite has a theoretical electrical capacity of about 372 mAh/g and a high irreversible capacity.

In addition, metals capable of forming alloys with lithium may be used as an anode active material for lithium batteries that has a higher electrical capacity than that of carbonaceous materials. Examples of metals capable of forming alloys with lithium include silicon (Si), tin (Sn), aluminum (Al), and the like. These metals have a very high electrical capacity. For example, a theoretical storage capacity of Si is 4,200 mAh/g. Such metals undergo volumetric expansion during charging and discharging of the batteries, thereby electrically isolating the active material within the electrode. In addition, an electrolyte decomposition reaction becomes severe, due to an increase in specific surface area of the active material. Moreover, a lithium battery including metals capable of forming alloys with lithium exhibits reduced capacity retention characteristics. For example, when the batteries are repeatedly charged and discharged, Si particles in the anode active material repeatedly aggregate with each other and are repeatedly crushed; therefore, Si is electrically disconnected from a current collector. Furthermore, metals capable of forming alloys with lithium are thermally unstable and thus problems such as thermal runaway may occur.

Therefore, there is a need to develop a method of manufacturing a lithium battery that includes a metal capable of forming alloys with lithium and has high capacity, excellent lifetime characteristics, and high thermal stability.

SUMMARY OF THE INVENTION

One or more embodiments of the present invention provide a composite anode active material consisting of a lithium titanate matrix including nanoparticles.

One or more embodiments of the present invention provide a method of preparing the composite anode active material.

One or more embodiments of the present invention provide an anode including the composite anode active material.

One or more embodiments of the present invention provide a lithium battery including the anode.

Additional aspects will be set forth in part in the description which follows and, in part, will be apparent from the description, or may be learned by practice of the presented embodiments.

In accordance with one or more embodiments of the present invention, a composite anode active material includes matrix particles including lithium titanate; and at least one nanoparticle dispersed in the matrix particles. The at least one nanoparticle includes at least one selected from the group consisting of metals capable of forming alloys with lithium and non-transition metal oxides.

In accordance with one or more embodiments of the present invention, a method of preparing a composite anode active material includes mixing nanoparticles, a titanium-containing precursor, and a solvent to prepare a mixed solution; mixing the mixed solution and water to induce a reaction therebetween to obtain nanoparticles coated with a titanium compound; mixing the coated nanoparticles and a lithium-containing precursor and drying the mixture to prepare a dried mixture; and sintering the dried mixture to prepare lithium titanate matrix particles.

In accordance with one or more embodiments of the present invention, an anode includes the composite anode active material.

In accordance with one or more embodiments of the present invention, a lithium battery includes the anode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
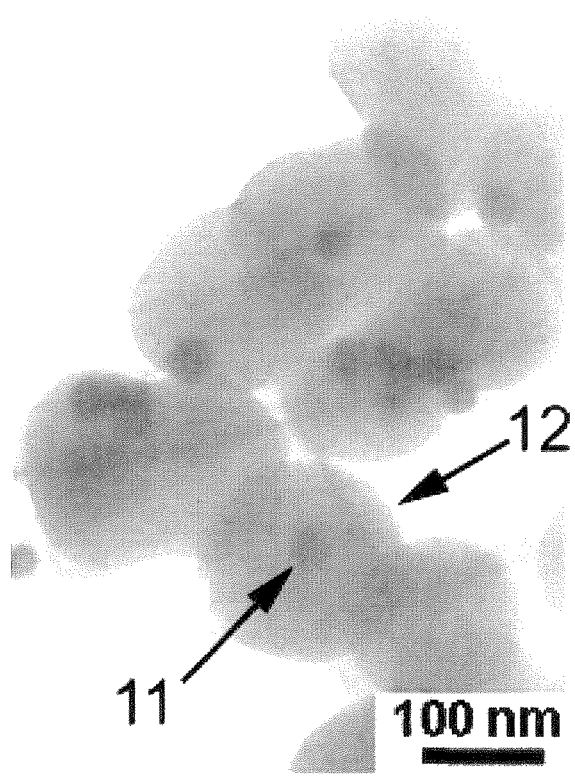
FIG. 1 is a transmission electron microscopic (TEM) image of a composite anode active material prepared according to Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of a composite anode active material, a method of preparing the composite anode active material, an anode including the composite anode active material, and a lithium battery including the anode will be described in detail with reference to the accompanying drawings.

In accordance with an embodiment of the present invention, a composite anode active material includes matrix particles including lithium titanate; and at least one nanoparticle dispersed in the matrix particles. The nanoparticle includes at least one selected from the group consisting of metals capable of forming alloys with lithium and a non-transition metal oxide. The matrix particles form a matrix into which the reinforcement is embedded and dispersed, and the matrix particles are continuously formed in the composite anode active material. The at least one nanoparticle here is the reinforcement embedded and dispersed in the matrix particles. As shown in FIG. 1, at least one nanoparticle 11 is dispersed in the composite anode active material.

The composite anode active material includes the nanoparticle capable of intercalating and deintercalating lithium, and thus may exhibit an improved electrical capacity. In addition, lithium titanate constituting a matrix has a high operating voltage of approximately 1.5 V with respect to lithium metal and a high thermal stability, and thus suppresses side reactions between metal nanoparticles and an electrolyte, whereby a lithium battery may have improved lifetime characteristic and thermal stability.

The amount of the nanoparticle may be in the range of about 5 to about 60 wt % based on the total weight of the composite anode active material. The amount of the nanoparticle is however not particularly limited thereto, and may be adjusted within a range that improves performances of a lithium battery including the composite anode active material. For example, the amount of the nanoparticle may range from about 10 to about 40 wt %, for example, from about 10 to about 20 wt %, based on the total weight of the composite anode active material.

The nanoparticles may have an average diameter of less than 300 nm. For example, the average diameter of the nanoparticles may be from about 1 to about 300 nm, for example, from about 1 to about 100 nm, for example, from about 10 to about 100 nm. The nanoparticles having the average diameter within the range described above are suitable for use in a lithium battery that provides improved performances.

The metal capable of forming alloys with lithium may be at least one selected from the group consisting of silicon (Si), tin (Sn), aluminum (Al), germanium (Ge), plumbum (Pb), bismuth (Bi), stibium (Sb), and alloys thereof. The metal capable of forming alloys with lithium is however not limited to the above examples, and any metal capable of forming alloys with lithium that may be used in the art may be used. For example, the metal capable of forming alloys with lithium may be Si.

The non-transition metal oxide may be at least one selected from the group consisting of $SnO_2$, $SiO_x$ where $0<x<2$, and mixtures thereof. The non-transition metal oxide is however not particularly limited thereto, and any non-transition metal oxide used in the art may be used. For example, the non-transition metal oxide may be $SiO_x$ where $0<x<2$. For example, the non-transition metal oxide may be $SiO_{1/2}$, SiO, or $SiO_2$.

The matrix particles may be at least one type selected from the group consisting of a spherical type, a rod type, an oval type, and a dumbbell type. As shown in FIG. 1, the matrix particles 12 may be of various types. For example, the matrix particles may be of a spherical, oval or rod type having an aspect ratio of less than 5. For example, the aspect ratio of the matrix particles may range from about 1 to about 5, for example, from about 1 to about 3. The "aspect ratio" refers to a ratio between the width and the height of a matrix particle viewed from the surface of the matrix particles where the width is greater than the height.

The matrix particles may have a major axis length of 10 μm or less. For example, the major axis length of the matrix particles may range from about 100 nm to about 10 μm. The matrix particles may have a spinel structure. Due to the spinel structure of the matrix particles, a change in volume between lattices is suppressed during charging and discharging of the battery, and thus, a lithium battery including the composite anode active material may exhibit improved lifetime characteristics.

The lithium titanate may be represented by Formula 1 below, but is not limited thereto. That is, any lithium titanate used in the art may be used:

$Li_xTi_yO_4$  <Formula 1> where $0.8 \leq x \leq 1.4$ and $1.6 \leq y \leq 2.2$.

For example, the lithium titanate may be $Li_4Ti_5O_{12}$.

The composite anode active material may further include a carbonaceous material. The carbonaceous material may be partially or entirely formed on a surface of the nanoparticle. The carbonaceous material may also be partially or entirely formed on surfaces of the matrix particles. For example, the nanoparticle and/or the matrix particles may be partially or completely coated with the carbonaceous material. For example, the carbonaceous material may be included in the matrix particles. Since the composite anode active material may further include the carbonaceous material, the conductivity of the composite anode active material may be further improved.

The carbonaceous material may be a low crystalline carbon or an amorphous carbon that has an interlayer spacing ($d_{002}$) of 3.45 Å or more. A low crystalline or amorphous carbonaceous material does not have side reactions with an electrolytic solution during charging and discharging of the battery, and thus decomposition of the electrolytic solution is suppressed, which results in high charge and discharge efficiencies. The carbonaceous material may be a sintered product of a carbon precursor. Any low crystalline or amorphous carbonaceous material used in the art may be used as long as it does not have side reactions with an electrolytic solution.

Figure 3:
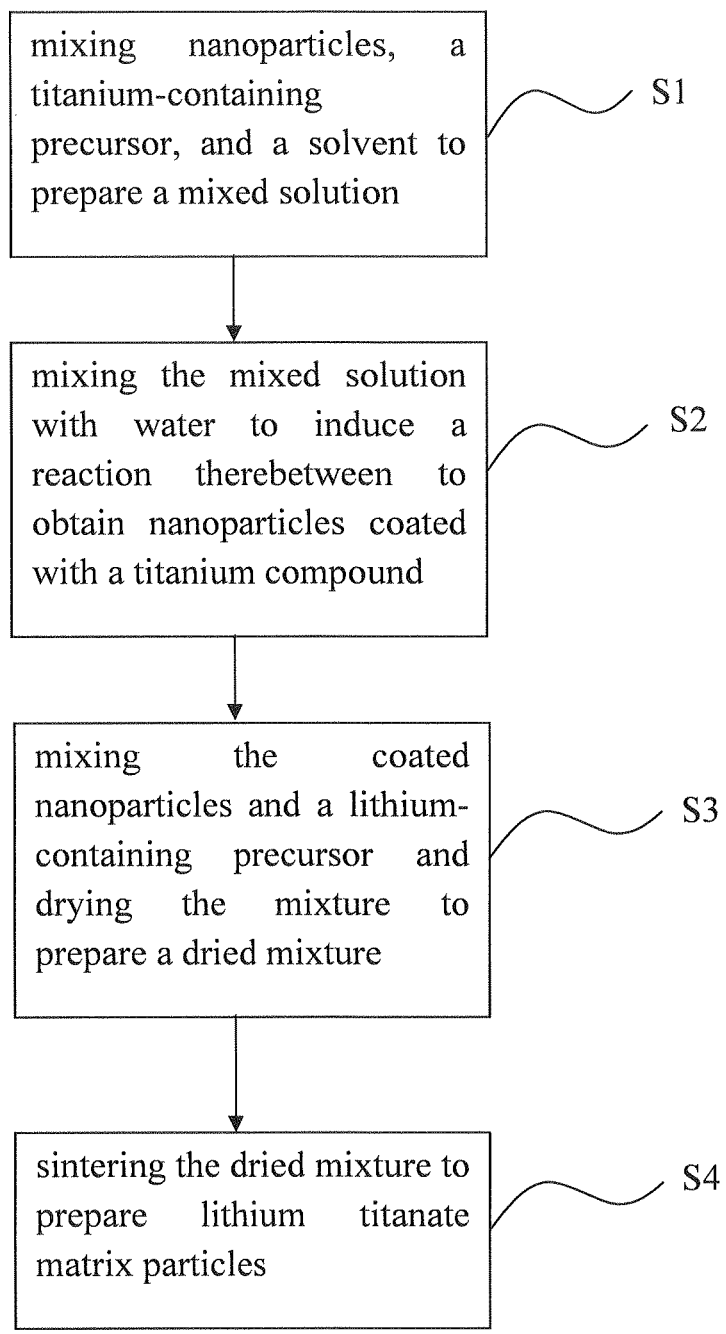
FIG. 3 is a flow chart illustrating the method of preparing composite anode active material in accordance with another embodiment of the present invention.

In accordance with another embodiment of the present invention, as shown in FIG. 3, a method of preparing a composite anode active material includes mixing nanoparticles, a titanium-containing precursor, and a solvent to prepare a mixed solution (S1); mixing the mixed solution with water to induce a reaction therebetween to obtain nanoparticles coated with a titanium compound (S2); mixing the coated nanoparticles and a lithium-containing precursor and drying the mixture to prepare a dried mixture (S3); and sintering the dried mixture to prepare lithium titanate matrix particles (S4).

The titanium-containing precursor may be at least one selected from the group consisting of titanium isopropoxide, titanium ethoxide, titanium propoxide, and titanium tetrachloride. The titanium-containing precursor is however not particularly limited thereto, and any titanium-containing precursor known in the art may be used.

The lithium-containing precursor may be at least one selected from the group consisting of lithium carbonate, lithium hydroxide, lithium chloride, and lithium nitrate. The lithium-containing precursor is however not particularly limited thereto, and any lithium-containing precursor known in the art may be used.

The solvent may be at least one selected from the group consisting of ethanol, methanol, isopropyl alcohol, butanol, and pentanol. The solvent is however not particularly limited thereto, and any solvent known in the art may be used.

The sintering of the dried mixture may be performed at a temperature ranging from about 700 to about 900° C. The sintering temperature is however not particularly limited thereto and may be appropriately adjusted within a range in which lithium titanate matrix particles including nanoparticles can be prepared. For example, the sintering temperature of the dried mixture may range from about 750 to about 850° C.

The sintering of the dried mixture may be performed for about 1 to about 20 hours. The sintering time is however not particularly limited thereto and may be appropriately adjusted within a range in which lithium titanate matrix particles including nanoparticles can be prepared. For example, the sintering time of the dried mixture may range from about 3 to about 10 hours.

The sintering of the dried mixture may be performed in an inert atmosphere. The sintering atmosphere is however not particularly limited thereto and may be appropriately adjusted within a range in which lithium titanate matrix particles including nanoparticles can be prepared. For example, the sintering of the dried mixture may be performed in an atmosphere consisting of Ar, Ne, $N_2$, or a mixture thereof.

In the method of preparing a composite anode active material, the mixed solution may further include a carbon precursor. Due to the inclusion of the carbon precursor in the mixed solution, the prepared matrix particles may include a carbonaceous material. The carbonaceous material may further improve the conductivity of the matrix particles.

The carbon precursor may be at least one selected from the group consisting of a polymer, polyol, and sucrose. The carbon precursor is however not particularly limited thereto, and any carbon precursor known in the art, which is sintered to prepare a carbonaceous material, may be used. Examples of the polymer include a vinyl-based resin, a cellulose-based resin, a phenol-based resin, a pitch-based resin, and a tar-based resin. For example, the carbon precursor may be polyvinyl alcohol or sucrose.

The carbon precursor may be at least one polyol selected from the group consisting of glycerol, erythritol, threitol, arabitol, xylitol, ribitol, mannitol, sorbitol, dulcitol, iditol, isomalt, maltitol, and lactitol. Since the mixed solution includes the polyol, the growth of the nanoparticles in the mixed solution is suppressed, and thus the size of the matrix particles may decrease.

In accordance with another embodiment of the present invention, an anode may include the composite anode active material. For example, the anode may be prepared as follows.

A composite anode active material, a conducting agent, a binder, and a solvent are mixed to prepare an anode active material composition, and then the anode active material composition may be directly coated on a copper current collector, to obtain an anode plate. Alternatively, the anode active material composition may be cast on a separate support, and then an anode active material film separated from the support is laminated on a copper current collector, to obtain an anode plate.

Examples of the conducting agent include carbon black, a graphite particulate, natural graphite, artificial graphite, acetylene black, Ketjen black, carbon fiber; carbonaceous materials such as carbon nanotubes; metal powder, fiber or tube of copper, nickel, aluminum, or silver; and conductive polymers such as polyphenylene derivatives. The conducting agent is however not limited thereto, and any conducting agent known in the art may be used.

Examples of the binder include a vinylidene fluoride/hexafluoropropylene copolymer, polyvinylidene fluoride, polyacrylonitrile, polymethylmethacrylate, polytetrafluoroethylene (PTFE), mixtures of the above-mentioned polymers, and a styrene butadiene rubber polymer. The solvent may be N-methyl-pyrrolidone (NMP), acetone, water, or the like. The binder and the solvent are however not limited to the above examples, and any binder and solvent known in the art may be used.

When desired, the anode active material composition may further include a plasticizer and thus pores may be formed in an electrode plate.

Amounts of the composite anode active material, the conducting agent, the binder, and the solvent may be used at the same levels as commercially used in a lithium battery. According to the application and structure of a lithium battery to be manufactured, at least one of the conducting agent, the binder, and the solvent may not be used.

Also, the anode may further include other general anode active materials, in addition to the composite anode active material. Any general anode active material for lithium batteries that is known in the art may be used. For example, a general anode active material may be at least one selected from the group consisting of lithium metal, metals capable of forming alloys with lithium, a transition metal oxide, a non-transition metal oxide, and carbonaceous materials.

Examples of metals capable of forming alloys with lithium include Si; Sn; Al; Ge; Pb; Bi; Sb; a Si—Y alloy where Y is an alkali metal, an alkali earth metal, a Group 13 element, a Group 14 element, a transition metal, a rare-earth element, or combinations thereof and is not Si; and a Sn—Y alloy where Y is an alkali metal, an alkali earth metal, a Group 13 element, a Group 14 element, a transition metal, a rare-earth element, or combinations thereof and is not Si. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

For example, the transition metal oxide may be a lithium titanium oxide, a vanadium oxide, or a lithium vanadium oxide.

For example, the non-transition metal oxide may be $SnO_2$ or $SiO_x$ where $0<x<2$.

The carbonaceous material may be a crystalline carbon, an amorphous carbon, or mixtures thereof. Examples of the crystalline carbon include natural graphite and artificial graphite, each of which has an amorphous shape, a plate shape, a flake shape, a spherical shape, or a fiber shape. Examples of the amorphous carbon include soft carbon (low-temperature calcined carbon), hard carbon, meso-phase pitch carbide, and calcined coke.

In addition, except that the anode includes the composite anode active material, a preparation method, a composition, and a structure of the anode may be appropriately adjusted in order for the anode to be used in other electrochemical cells, such as a supercapacitor, as well as a lithium battery.

In accordance with another embodiment of the present invention, a lithium battery includes the anode including the composite anode active material. The lithium battery may be manufactured as follows.

First, an anode is prepared as described above.

Next, a cathode may be prepared as follows. The cathode may be prepared using the same method as that used to prepare the anode, except that a cathode active material is used instead of the composite anode active material.

A cathode active material, a conducting agent, a binder, and a solvent are mixed to prepare a cathode active material composition. In this regard, the conducting agent, the binder, and the solvent may be the same as those used to prepare the anode. Then, the cathode active material composition may be directly coated on an aluminum current collector and the coated aluminum current collector is dried to obtain a cathode plate on which a cathode active material layer is formed. Alternatively, the cathode active material composition may be cast on a separate support, and then a cathode active material film separated from the support is laminated on an aluminum current collector to obtain a cathode plate on which a cathode active material layer is formed.

Any lithium-containing metal oxide that is commonly used in the art may be used as the cathode active material. The lithium-containing metal oxide may be at least one selected from composite oxides of lithium and a metal selected from cobalt, manganese, nickel, and combinations thereof. In particular, the lithium-containing metal oxide may be a compound represented by any one of Formulae: $Li_aA_{1-b}B_bD_2$ where $0.90 \leq a \leq 1.8$ and $0 \leq b \leq 0.5$; $Li_aE_{1-b}B_bO_{2-c}D_c$ where $0.90 \leq a \leq 1.8$, $0 \leq b \leq 0.5$, and $0 \leq c \leq 0.05$; $LiE_{2-b}B_bO_{4-c}D_c$ where $0 \leq b \leq 0.5$ and $0 \leq c \leq 0.05$; $Li_aNi_{1-b-c}Co_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB_cO_{2-\alpha}F_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is Ni, Co, Mn, or combinations thereof; B is Al, Ni, Co, Mn, Cr, Fe, Mg, Sr, V, a rare-earth element, or combinations thereof; D is O, F, S, P, or combinations thereof; E is Co, Mn, or combinations thereof; F is F, S, P, or combinations thereof; G is Al, Cr, Mn, Fe, Mg, La, Ce, Sr, V, or combinations thereof; Q is Ti, Mo, Mn, or combinations thereof; I is Cr, V, Fe, Sc, Y, or combinations thereof; and J is V, Cr, Mn, Co, Ni, Cu, or combinations thereof.

For example, the cathode active material may be $LiCoO_2$, $LiMn_xO_2$, where $x=1$ or 2, $LiNi_{1-x}Mn_xO_{2x}$, where $0 < x < 1$, $Ni_{1-x-y}Co_xMn_yO_2$ where $0 \leq x \leq 0.5$ and $0 \leq y \leq 0.5$, or $LiFePO_4$.

The compounds described above as a cathode active material may have a coating layer at their surfaces. Also, a compound without a coating layer and a compound with a coating layer may be used in combination. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds constituting the coating layer may be amorphous or crystalline. The coating element included in the coating layer may be Mg, Al, Co, K, Na, Ca, Si, Ti, V, Sn, Ge, Ga, B, As, Zr, or mixtures thereof. A coating layer may be formed by using the coating elements in the aforementioned compounds by using any one of various methods that do not adversely affect physical properties of a cathode active material (e.g., spray coating or immersion). The coating layer formation methods may be obvious to one of ordinary skill in the art and thus, will not be described herein in detail.

The amounts of the cathode active material, the conducting agent, the binder, and the solvent may be used at the same level as those used in a general lithium battery.

Next, a separator interposed between the cathode and the anode is prepared. The separator may be any separator that is commonly used in lithium batteries. In particular, the separator may have low resistance to migration of ions in an electrolyte and may have a high electrolyte-retaining ability. Examples of the separator may include glass fiber, polyester, Teflon, polyethylene, polypropylene, polytetrafluoroethylene (PTFE), and combinations thereof, each of which may be a nonwoven fabric or a woven fabric. For example, a windable separator such as polyethylene, polypropylene or the like may be used for a lithium ion battery, and a separator that may retain a large amount of an organic electrolytic solution may be used for a lithium-ion polymer battery. For example, the separator may be prepared as follows.

A polymer resin, a filler, and a solvent are mixed to prepare a separator composition. The separator composition is directly coated on an electrode, and then dried to form a separator. Alternatively, the separator composition may be cast on a support and dried, and a separator film separated from the support is then laminated on the electrode, thereby completing the preparation of a separator.

Any polymer resin that is commonly used for binding electrode plates in lithium batteries may be used without limitation. Examples of the polymer resin include polyethylene, polypropylene, a polyethylene/polypropylene copolymer, a vinylidenefluoride/hexafluoropropylene copolymer, polyvinylidene fluoride (PVDF), polyacrylonitrile, polymethylmethacrylate, and mixtures thereof.

Next, an electrolyte is prepared.

For example, the electrolyte may be an organic electrolytic solution. In addition, the electrolyte may be in a solid form. Examples of the electrolyte include boron oxides, lithium oxynitride, and the like. The electrolyte is however not limited to the above examples, and may be any solid electrolyte used in the art. The solid electrolyte may be formed on the anode by sputtering.

For example, an organic electrolytic solution may be prepared by dissolving a lithium salt in an organic solvent.

Any organic solvent used in the art may be used. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

Any lithium salt that is commonly used in the art may be used. For example, the lithium salt may be $LiPF_6$, $LiBF_4$, $LiSBF_6$, $LiAsF_6$, $LiClO_4$, $LiCF_3SO_3$, $Li(CH_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, or a mixture thereof.

Figure 2:
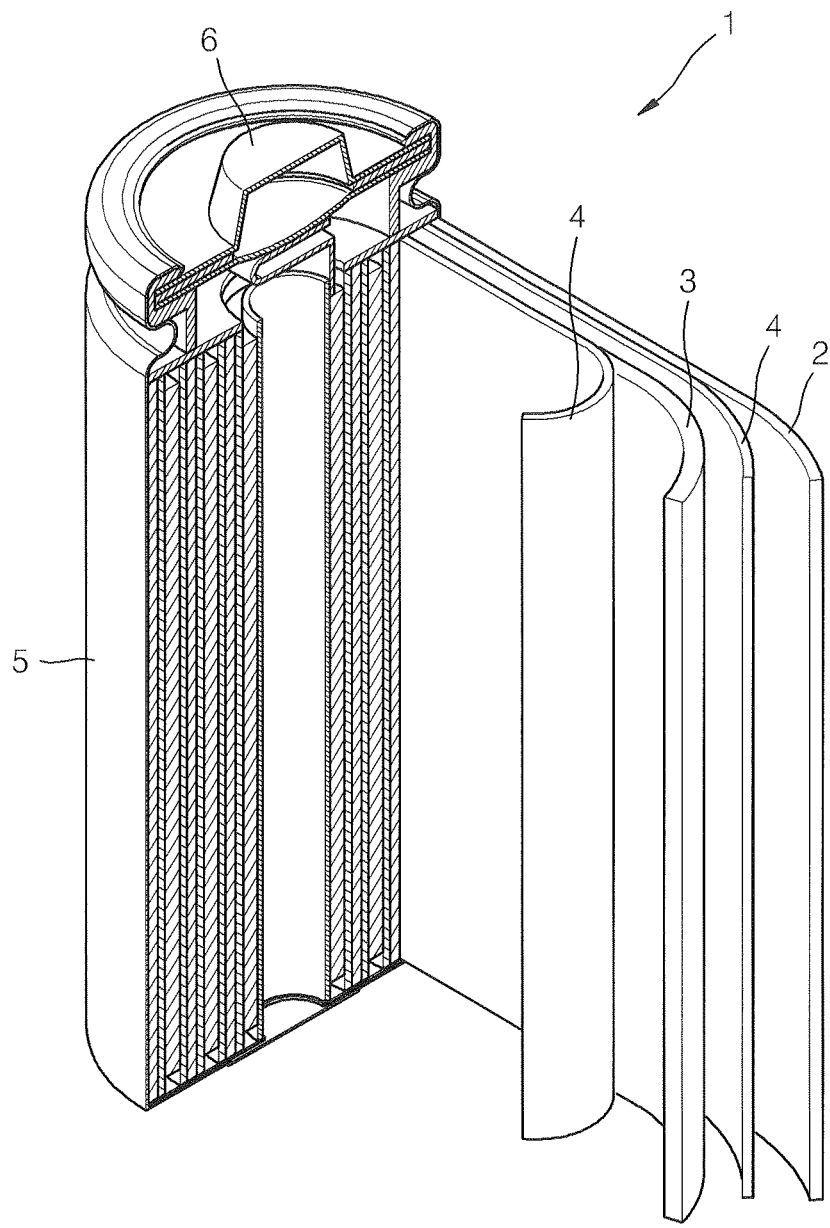
FIG. 2 is a schematic view of a lithium battery constructed with the principle of an embodiment of the present invention.

FIG. 2 is a schematic view of a lithium battery 1 constructed with an embodiment of the present invention. In reference to FIG. 2, the lithium battery 1 includes a cathode 3, an anode 2, and a separator 4. The cathode 3, the anode 2, and the separator 4 are wound or folded, and then accommodated in a battery case 5. Subsequently, an organic electrolyte is injected into the battery case 5 and the battery case 5 is sealed by a cap assembly 6, thereby completing the manufacture of the lithium battery 1. The battery case 5 may have a cylindrical shape, a rectangular shape or a thin-film shape. For example, the lithium battery 1 may be large-size thin-film-type battery. The lithium battery 1 may be a lithium ion battery.

The separator 4 may be disposed between the cathode 3 and the anode 2 to form a battery assembly. A plurality of battery assemblies may be stacked in a bi-cell structure and impregnated into an organic electrolytic solution. The resultant is put into a pouch and hermetically sealed, thereby completing the manufacture of a lithium ion polymer battery.

In addition, the plurality of battery assemblies are stacked to form a battery pack, and such a battery pack may be used in any devices requiring high capacity and high-power output. For example, the battery pack may be used in notebook computers, smart phones, or electric vehicles.

A lithium battery including the anode including the composite anode active material has high thermal stability, excellent lifetime characteristics, and high rate characteristics, and thus may be used in electric vehicles, power tools, and portable electronic devices.

One or more embodiments will now be described in further detail with reference to the following examples. These examples are for illustrative purposes only and are not intended to limit the scope of the one or more embodiments.

Preparation of Composite Anode Active Material

Example 1

157.92 g of titanium isopropoxide was added to a dispersion prepared by dispersing 2.65 g of powder of Si nanoparticles having an average diameter of 50 nm in 800 ml of ethanol and the mixture was stirred at room temperature to prepare a mixed solution. Then, 35 g of distilled water was added to the mixed solution and the resultant mixed solution was stirred for 2 hours to induce a hydrolysis reaction therebetween. As a result of completion of the reaction, a pale gray sol was obtained. Thereafter, acetone with a weight six times greater than that of the sol was added to the sol and the resultant sol was centrifuged at 5,000 rpm for 10 minutes, and the solvent was removed therefrom to obtain precipitated powder (Si nanoparticles coated with $Ti(OH)_4$). The obtained powder was dried at 100° C. for 12 hours. The dried powder was put in a mixer including 32.84 g of lithium carbonate ($Li_2CO_3$) to obtain a dried mixture. The dried mixture was put in an alumina crucible, the temperature of the alumina crucible was raised up to 800° C. at a heating rate of 5° C./min in an inert atmosphere, and the dried mixture was sintered at 800° C. for 5 hours. The sintered product was disintegrated and classified to prepare as a composite anode active material powder-type $Li_4Ti_5O_{12}$ matrix particles with Si nanoparticles dispersed therein and having a spinel structure. The amount of Si in the composite anode active material was 10 wt % based on the total weight of the composite anode active material.

A transmission electron microscopic (TEM) image of the prepared composite anode active material is shown in Table 1.

Example 2

A composite anode active material was prepared in the same manner as in Example 1, except that the composition of the reactants was changed so that the amount of Si was 30 wt % based on the total weight of the composite anode active material.

Example 3

A composite anode active material was prepared in the same manner as in Example 1, except that the composition of the reactants was changed so that the amount of Si was 5 wt % based on the total weight of the composite anode active material.

Example 4

A composite anode active material was prepared in the same manner as in Example 1, except that the composition of the reactants was changed so that the amount of Si was 75 wt % based on the total weight of the composite anode active material.

Example 5

A composite anode active material was prepared in the same manner as in Example 1, except that 402.95 g of sorbitol was added to the mixed solution.

Comparative Example 1

Powder of Si nanoparticles having an average diameter of 50 nm was itself used as an anode active material.

Comparative Example 2

A composite anode active material was prepared in the same manner as in Example 1, except that the lithium carbonate was not used. The obtained composite anode active material was $TiO_2$ matrix with Si nanoparticles dispersed therein.

Manufacture of Anode and Lithium Battery

Example 6

The composite anode active material prepared according to Example 1, a carbon conducting agent (Super-P, Timcal Inc.), and polyvinylidene fluoride (PVDF) as a binder were mixed at a weight ratio of 90:4:6 and the mixture was mixed with N-methylpyrrolidone NMP in an agate mortar to prepare an anode active material slurry. Then, the anode active material slurry was coated on a copper current collector to a thickness of about 50 μm by using a doctor blade, and the coated copper current collector was dried at room temperature for 2 hours and then was subjected to a pressing process. The pressed structure was dried in vacuum at 130° C. for 12 hours, thereby completing the manufacture of an anode plate.

The anode plate, a lithium metal as a counter electrode, a polypropylene separator (Cellgard 3510), and an electrolytic solution obtained by dissolving 1 M of $LiPF_6$ in a mixed solvent of ethylene carbonate (EC) and dimethyl carbonate (DMC) (weight ratio of 1:1) were used to manufacture a coin cell.

Examples 7 Through 10

Lithium batteries were manufactured in the same manner as in Example 6, except that the composite anode active materials prepared according to Examples 2 to 5 were respectively used.

Comparative Examples 3 and 4

Lithium batteries were manufactured in the same manner as in Example 6, except that the composite anode active materials prepared according to Comparative Examples 1 and 2 were respectively used.

Evaluation Example 1

Charge-Discharge Test

The lithium batteries manufactured according to Examples 6 through 10 and Comparative Examples 3 and 4 were charged with a current of 0.1 C until the voltage thereof reached 0.001 V (with respect to the Li metal), and then discharged at the same current until the voltage thereof reached 3 V (with respect to the Li metal). Then, the cycle of charging and discharging was repeatedly performed 50 times at the same current and voltage.

A discharge capacity at $1^{st}$ cycle, an initial charge and discharge efficiency, and a cycle retention rate of each of the lithium batteries of Examples 6 through 10 and Comparative Examples 3 and 4 are shown in Table 1 below. The capacity retention rate is defined by Equation 1 below, and the initial charge and discharge efficiency is defined by Equation 2 below:

Capacity retention rate[%]=[discharge capacity at $50^{th}$ cycle/discharge capacity at $2^{nd}$ cycle]×100   <Equation 1>

Initial charge and discharge efficiency[%]=[discharge capacity at $1^{st}$ cycle/charge capacity at $1^{st}$ cycle]×100   <Equation 2>

TABLE 1

| | Discharge capacity at $1^{st}$ cycle [mAh/g] | Initial charge and discharge efficiency [%] | Capacity retention rate [%] |
|---|---|---|---|
| Example 6 | 971 | 92 | 94 |
| Example 7 | 1068 | 91 | 93 |
| Example 8 | 673 | 93 | 91 |
| Example 9 | 1084 | 81 | 82 |
| Example 10 | 1130 | 91 | 95 |
| Comparative Example 3 | 1275 | 57 | 16 |
| Comparative Example 4 | 930 | 76 | 69 |

As shown in Table 1, the capacity retention rates of the lithium batteries of Examples 6 to 10 were higher than those of the lithium battery of Comparative Example 3 (Si only), and the initial charge and discharge efficiency and the discharge capacity of each of the lithium batteries of Examples 6 to 10 was higher than those of the lithium battery of Comparative Example 4 ($TiO_2$ coating layer).

Evaluation Example 2

Measurement of Calorific Value

The lithium batteries of Examples 6 to 10 and Comparative Examples 3 and 4 were subjected to one cycle of charging and discharging with a constant current of 0.05 C at a voltage ranging from about 0.01 to about 3.00 V with respect to the Li metal at 25° C.

Then, each lithium battery was charged once at 25° C. with a constant current of 0.1 C until the voltage thereof reached 0.001 V with respect to the Li metal.

Afterwards, the charged lithium batteries were broken, anode active materials were taken out of the lithium batteries, and differential scanning calorimeter (DSC) analysis was performed on each anode active material. The analysis results are shown in Table 2 below. In FIG. 2, the calorific values were calculated as integrated quantities of a heat flux curve.

TABLE 2

| | Calorific values [J/g] |
|---|---|
| Example 6 | 118 |
| Example 7 | 257 |
| Example 8 | 85 |
| Example 9 | 316 |
| Example 10 | 129 |
| Comparative Example 3 | 641 |
| Comparative Example 4 | 214 |

As shown in Table 2, the anode active materials of Examples 1 to 5 respectively used to manufacture the lithium batteries of Example 6 to 10 exhibited a reduced calorific value as compared to that of the anode active material of Comparative Example 1 used to manufacture the lithium battery of Comparative Example 3.

Therefore, the anode active materials of Examples 1 to 5 had a higher thermal stability than that of the anode active material of Comparative Example 1.

As described above, according to the one or more of the above embodiments of the present invention, a composite anode active material consists of a lithium titanate matrix including at least one nanoparticle. Thus, a lithium battery including the composite anode active material may have high discharge capacity, excellent lifetime characteristics, and high thermal stability.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A composite anode active material, comprising:
   non-porous matrix particles comprising lithium titanate; and
   at least one nanoparticle dispersed in the matrix particles, the at least one nanoparticle comprising at least one selected from the group consisting of metals capable of forming alloys with lithium and a non-transition metal oxide.

2. The composite anode active material of claim 1, wherein an amount of the nanoparticle is in a range of about 5 to about 60 wt % based on a total weight of the composite anode active material.

3. The composite anode active material of claim 1, wherein the nanoparticles have an average diameter of less than 300 nm.

4. The composite anode active material of claim 1, wherein the metal capable of forming alloys with lithium comprises at least one selected from the group consisting of Si, Sn, Al, Ge, Pb, Bi, Sb, and alloys thereof.

5. The composite anode active material of claim 1, wherein the non-transition metal oxide comprises at least one selected from the group consisting of $SnO_2$, $SiO_x$ where $0<x<2$, and mixtures thereof.

6. The composite anode active material of claim 1, wherein the matrix particles have an aspect ratio of less than 5.

7. The composite anode active material of claim 1, wherein the matrix particles have a major axis length of 10 μm or less.

8. The composite anode active material of claim 1, wherein the matrix particles have a spinel structure.

9. The composite anode active material of claim 1, wherein the lithium titanate is represented by Formula 1 below:

$$Li_xTi_yO_4 \quad \text{<Formula 1>}$$

where $0.8 \leq x \leq 1.4$ and $1.6 \leq y \leq 2.2$.

10. The composite anode active material of claim 1, further comprising a carbonaceous material.

11. The composite anode active material of claim 10, wherein the carbonaceous material is a low crystalline carbon or an amorphous carbon that has an interlayer spacing ($d_{002}$) of 3.45 Å or more.

12. A lithium battery comprising the composite anode active material according to claim 1.

13. A method of preparing a composite anode active material, the method comprising:
 preparing a mixed solution by mixing nanoparticles, a titanium-containing precursor, and a solvent;
 obtaining nanoparticles coated with a titanium compound by mixing the mixed solution and water to induce a reaction therebetween;
 preparing a dried mixture by mixing the coated nanoparticles and a lithium-containing precursor and drying the mixture; and
 preparing lithium titanate matrix particles by sintering the dried mixture.

14. The method of claim 13, wherein the titanium-containing precursor comprises at least one selected from the group consisting of titanium isopropoxide, titanium ethoxide, titanium propoxide, and titanium tetrachloride.

15. The method of claim 13, wherein the lithium-containing precursor comprises at least one selected from the group consisting of lithium carbonate, lithium hydroxide, lithium chloride, and lithium nitrate.

16. The method of claim 13, wherein the solvent comprises at least one selected from the group consisting of ethanol, methanol, isopropyl alcohol, butanol, and pentanol.

17. The method of claim 13, wherein the sintering is performed for about 1 to about 20 hours.

18. The method of claim 13, wherein the mixed solution further comprises a carbon precursor.

19. The method of claim 18, wherein the carbon precursor comprises at least one selected from the group consisting of glycerol, erythritol, threitol, arabitol, xylitol, ribitol, mannitol, sorbitol, dulcitol, iditol, isomalt, maltitol, and lactitol.

* * * * *